(12) United States Patent
Neet

(10) Patent No.: US 11,316,415 B2
(45) Date of Patent: Apr. 26, 2022

(54) METHOD OF WINDING A STATOR OF AN ELECTRIC MACHINE

(71) Applicant: BorgWarner Inc., Auburn Hills, MI (US)

(72) Inventor: Kirk Neet, Noblesville, IN (US)

(73) Assignee: BORGWARNER INC., Auburn Hills, MI (US)

( * ) Notice: Subject to any disclaimer, the term of this patent is extended or adjusted under 35 U.S.C. 154(b) by 258 days.

(21) Appl. No.: 16/537,052

(22) Filed: Aug. 9, 2019

(65) Prior Publication Data

US 2020/0052562 A1 Feb. 13, 2020

Related U.S. Application Data

(60) Provisional application No. 62/717,699, filed on Aug. 10, 2018.

(51) Int. Cl.
*H02K 15/085* (2006.01)
*H02K 15/00* (2006.01)
*H02K 15/04* (2006.01)

(52) U.S. Cl.
CPC ....... *H02K 15/085* (2013.01); *H02K 15/0037* (2013.01); *H02K 15/0081* (2013.01); *H02K 15/0478* (2013.01)

(58) Field of Classification Search
CPC ........... H02K 15/0037; H02K 15/0081; H02K 15/0478; H02K 15/085; H02K 3/12; H02K 3/28
See application file for complete search history.

(56) References Cited

U.S. PATENT DOCUMENTS

| 6,901,649 B2 | 6/2005 | Imori et al. |
| 7,269,888 B2 | 9/2007 | Neet |
| 7,703,192 B2 | 4/2010 | Sadiku et al. |
| 7,952,245 B2 | 5/2011 | Ueda et al. |

(Continued)

FOREIGN PATENT DOCUMENTS

| CN | 106787337 A | 5/2017 | |
| EP | 1988619 A1 * | 11/2008 | ............. H02K 3/522 |

(Continued)

OTHER PUBLICATIONS

International Search Report and Written Opinion for International Applciation No. PCT/US2019/045949; International Filing Date Aug. 9, 2019; Report dated Nov. 28, 2019 (pp. 1-9).

(Continued)

*Primary Examiner* — Minh N Trinh
(74) *Attorney, Agent, or Firm* — Cantor Colburn LLP

(57) ABSTRACT

A method of installing a winding in a stator includes forming a first multi-conductor winding including a first plurality of terminal leads and a second plurality of terminal leads, forming a second multi-conductor winding including a third plurality of terminal leads and a fourth plurality of terminal leads, introducing the first multi-conductor winding into a plurality of stator slots of a stator body, introducing the second multi-conductor winding into the plurality of stator slots of the stator body radially inwardly of the first multi-conductor winding, and connecting the second plurality of terminal leads with the third plurality of terminal leads to form a twelve conductor stator winding.

18 Claims, 20 Drawing Sheets

(56) References Cited

U.S. PATENT DOCUMENTS

| | | | |
|---|---|---|---|
| 8,832,928 B2 | 9/2014 | Akimoto et al. | |
| 9,071,115 B2* | 6/2015 | Bodin | H02K 15/066 |
| 10,523,095 B2* | 12/2019 | Darras | H02K 15/026 |
| 2006/0163959 A1 | 7/2006 | Ogawa et al. | |
| 2009/0320275 A1 | 12/2009 | Dobashi et al. | |
| 2010/0231082 A1 | 9/2010 | Bodin et al. | |
| 2014/0042865 A1 | 2/2014 | Mourou et al. | |
| 2014/0252908 A1 | 9/2014 | Sadiku et al. | |
| 2014/0354095 A1 | 12/2014 | Ishikawa et al. | |
| 2015/0054374 A1 | 2/2015 | Neet | |
| 2017/0229936 A1 | 8/2017 | Kang et al. | |
| 2020/0028417 A1 | 1/2020 | Neet et al. | |
| 2020/0052537 A1 | 2/2020 | Yoon | |
| 2020/0052561 A1 | 2/2020 | Neet | |
| 2020/0052562 A1* | 2/2020 | Neet | H02K 3/28 |

FOREIGN PATENT DOCUMENTS

| | | |
|---|---|---|
| JP | H1198786 A | 4/1999 |
| JP | 2004023808 A | 1/2004 |
| JP | 2009148147 A | 7/2009 |

OTHER PUBLICATIONS

International Search Report and Written Opinion for International Application No. PCT/US2019/045947; International Filing Date Aug. 9, 2019; Report dated Nov. 28, 2019 (pp. 1-8).
International Search Report and Written Opinion for International Application No. PCT/US2019/045967; International Filing Date Aug. 9, 2019; Report dated Dec. 5, 2019 (pp. 1-8).
International Search Report and Written Opinion for International Application No. PCT/US2019/016243 International Filing Date Feb. 1, 2019; Report dated May 17, 2019 (pp. 1-8).

* cited by examiner

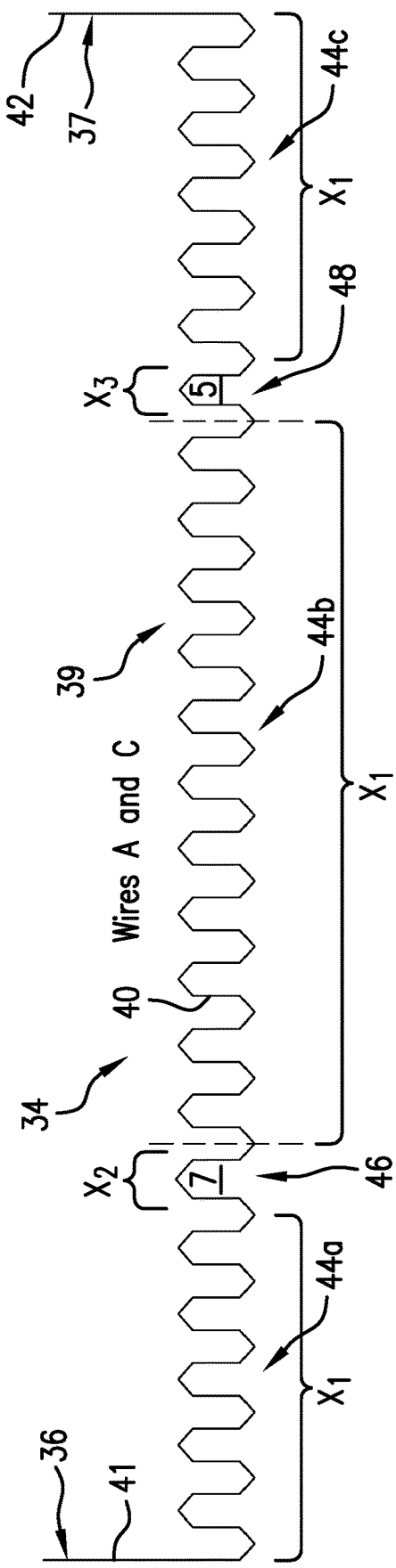
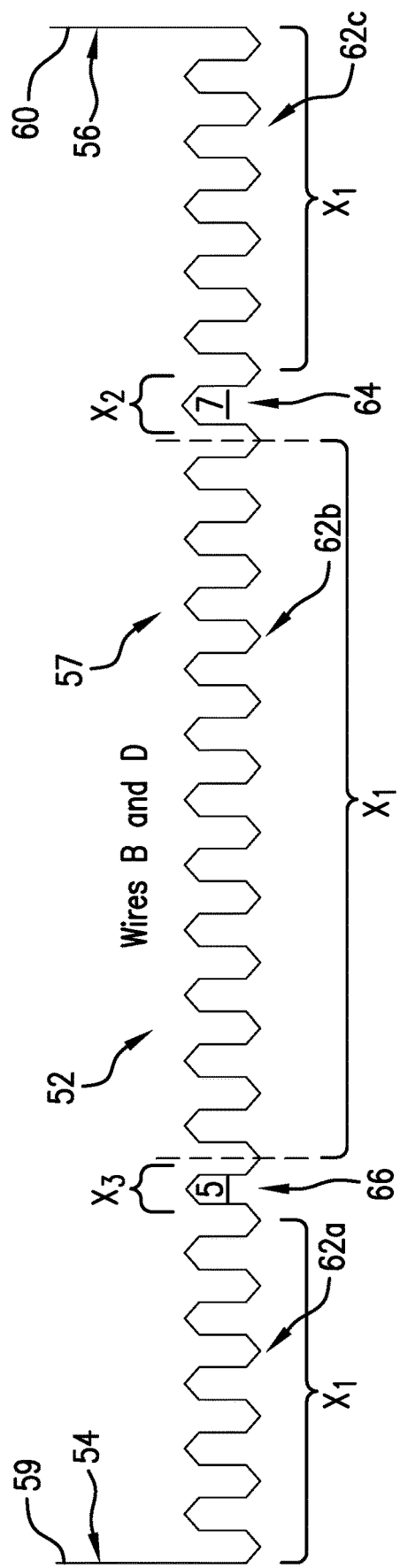
FIG.2
FIG.3

METHOD OF WINDING A STATOR OF AN ELECTRIC MACHINE

CROSS-REFERENCE TO RELATED APPLICATIONS

This application claims the benefit of an earlier filing date from U.S. Provisional Application No. 62/717,699 filed Aug. 10, 2018, the entire disclosure of which is incorporated herein by reference.

BACKGROUND

The stator of an electrical motor or generator includes two parts and insulation material. The first part is the lamination. A lamination is typically formed of laminated sheets of electrical steel that is formed (stamped, rolled or bent) into an annulus shape having an ID, an OD and a stack height. The lamination further includes slots open to the ID or OD. The slots have a width and a depth. In between each slot is a lamination tooth that extends from the ID or OD lamination back iron (yoke).

The second part is the winding. The winding is typically formed of insulated copper wire. It should be understood however, other conductive materials, such as aluminum, might be used. The winding includes a number of phases—typically 3, 5 or 6. The number of phases may vary. For each phase, the winding includes conductors having slot segments and end loops. The slot segments are housed in the lamination slots. The end loops span mostly circumferentially and connect two slot segments together. The winding may be a delta winding or a wye winding.

A distributed winding is a winding that has poles of one phase that include more than one slot, typically adjacent slots. Each phase may also occupy multiple winding layers. For example, in a 3 phase winding, there may be 24 poles, with two slots being occupied by each pole and the winding may occupy 8 winding layers. Each pole may span three slots, but only occupy two slots at a time in any given winding layer. The winding should be electrically balanced in order to minimize losses and increase efficiency. Creating an electrically balanced winding that may be introduced into more compact stators is a challenge. Accordingly, the industry would be receptive of a system that forms a balanced stator winding that has a reduced thickness and which may be incorporated into more compact stator cores.

SUMMARY

Disclosed is a method of installing a winding in a stator including forming a first multi-conductor winding including a first plurality of terminal leads and a second plurality of terminal leads, forming a second multi-conductor winding including a third plurality of terminal leads and a fourth plurality of terminal leads, introducing the first multi-conductor winding into a plurality of stator slots of a stator body, introducing the second multi-conductor winding into the plurality of stator slots of the stator body radially inwardly of the first multi-conductor winding, and connecting the second plurality of terminal leads with the third plurality of terminal leads to form a twelve conductor stator winding.

BRIEF DESCRIPTION OF THE DRAWINGS

FIG. 2 depicts a conductor of the winding of the stator of FIG. 1, in accordance with an aspect of an exemplary embodiment;

FIG. 3 depicts another winding of the stator of FIG. 1, in accordance with an aspect of an exemplary embodiment;

DETAILED DESCRIPTION

A detailed description of one or more embodiments of the disclosed apparatus and method are presented herein by way of exemplification and not limitation with reference to the Figures.

Figure 1:
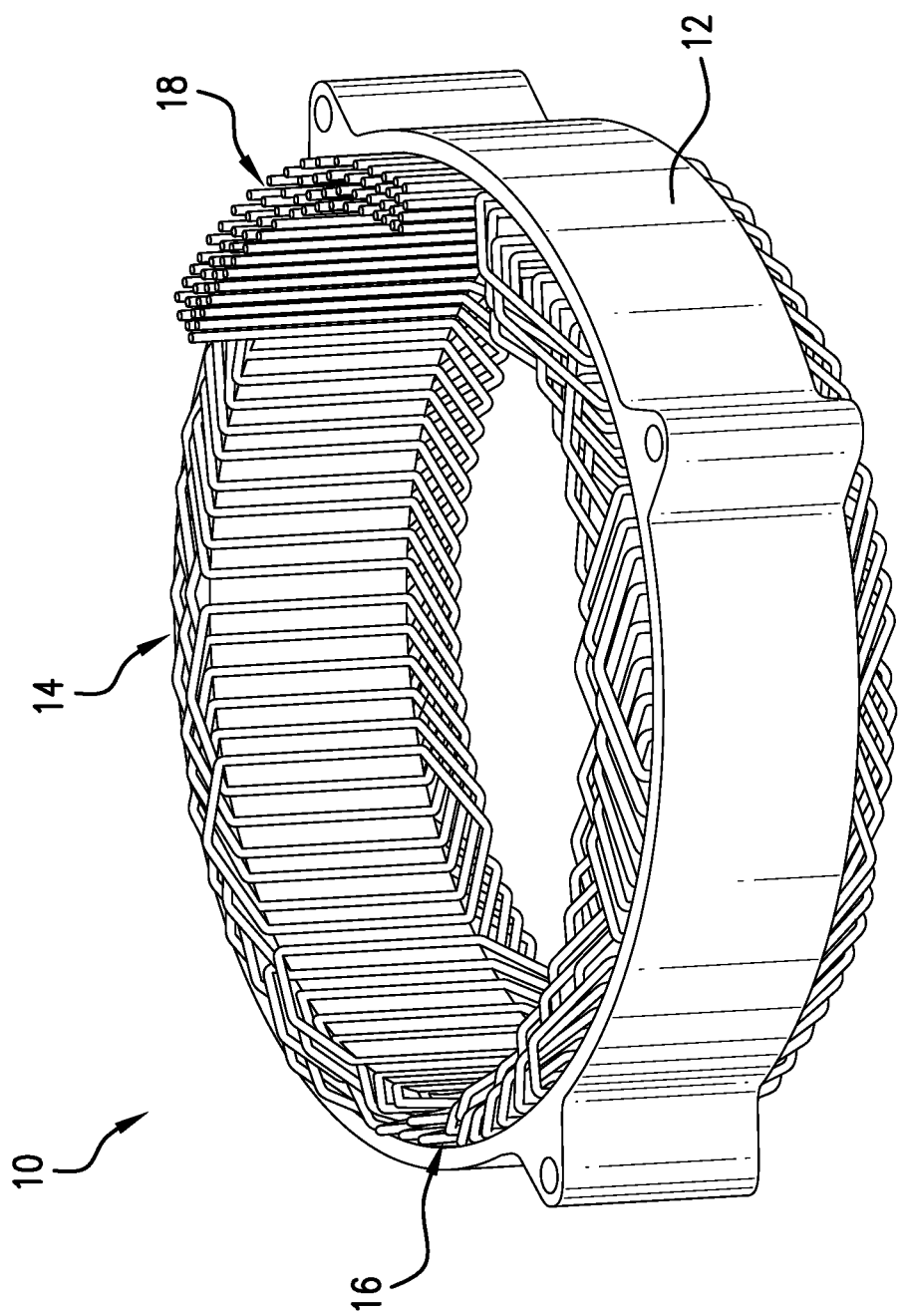
FIG. 1 depicts a stator for an electric motor including a winding, formed in accordance with an aspect of an exemplary embodiment.

A stator for an electric machine is indicated generally at 10 in FIG. 1. Stator 10 includes a stator body 12 that supports a plurality of windings 14. Stator body 12 may be formed from an electrically conductive material and includes a plurality of slots (not shown) which, in the embodiment shown, are formed in an inner annular surface (also not shown). Windings 14 include a woven section 16 and a connector lead section 18. Woven section 16 defines a portion of winding 14 at which point conductors may be interlaced to establish a desired form factor and electrical balance. Connector lead section 18 defines a portion at terminal ends of the conductors forming winding 14 may be interconnected and coupled to, for example, a power source.

Winding 14 is formed by creating woven conductor pairs of AB conductors and B/D conductors. As will become apparent herein, a B conductor may represent a mirror image of an A conductor and a D conductor may represent a mirror image of a C conductor, with the A and C conductors being substantially identical and the B and D conductors being substantially identical. Referring to FIG. 2, a first conductor 34 is shown to include a first end 36, a second end 37, a plurality of end turns 39 joining a plurality of slot segments, one of which is shown at 40, extending therebetween. First conductor 34 may represent either an A conductor or a C conductor depending upon position.

First end 36 of first conductor 34 defines a first connector lead 41 and second end 37 defines a second connector lead 42. Plurality of end turns 39 include a first plurality of bends 44A having a first winding pitch X1, a second plurality of bends 44B having the first winding pitchy X1, and a third plurality of bends 44C having the first winding pitch X1. Plurality of end turns 39 also include a bend 46 having a second winding pitch X2 and a bend 48 having a third winding pitch X3. Second winding pitch X2 may be one greater than first winding pitch X1 and third winding pitch X3 may be one less than first winding pitch X1. In an embodiment, first winding pitch X1 may represent a 6 pitch, second winding pitch X2 may represent a 7 pitch, and third winding pitch X3 may represent a 5 pitch. The particular pitch value may vary. The phrase 6 pitch describes that a particular end loop connects two slot segments that span over 5 slots.

Figure 4:
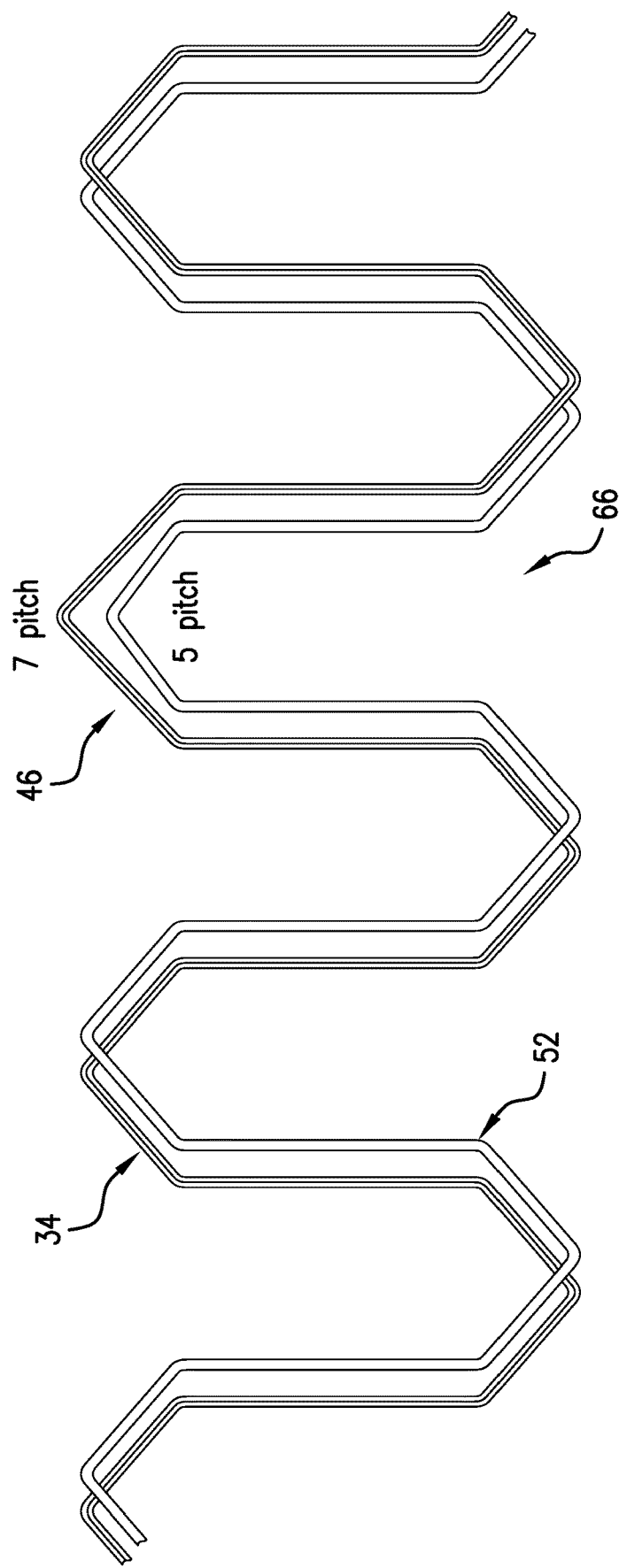
FIG. 4 depicts a portion of the winding and a portion of the another winding woven together, in accordance with an aspect of an exemplary embodiment.

Referring to FIG. 3, a second conductor 52 is shown to include a first end portion 54, a second end portion 56, and a plurality of end turns 57 extending therebetween. First end portion 54 of second conductor 52 defines a first connector lead 59 and second end portion 56 defines a second connector lead 60. Plurality of end turns 57 include a first plurality of bends 62A having the first winding pitch X1, a second plurality of bends 62B having the first winding pitchy X1, and a third plurality of bends 62C having the first winding pitch X1. Plurality of end turns 57 also include a bend 646 having a third winding pitch X3 and a bend 66 having the third winding pitch X3. As will be detailed herein, bend 66 of second conductor 52 is positioned so as to next within bend 46 of first conductor 34 as shown in FIG. 4. With this arrangement, a relative position of first and second conductors 34 and 52 may change one or more times between first ends 36 and 54 and second end 37 and 55.

Figure 5:
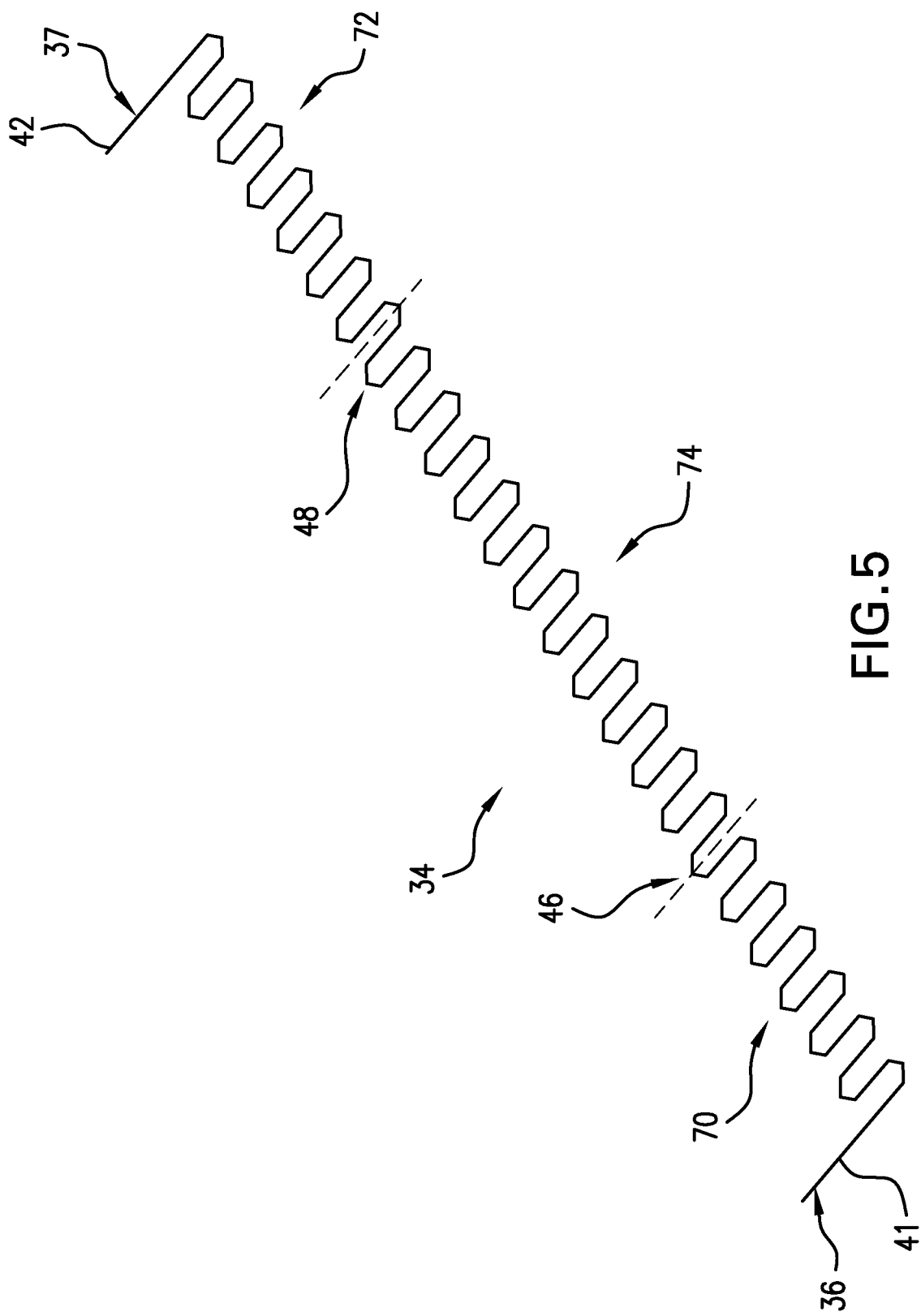
FIG. 5 depicts the winding of FIG. 2 preparing for a weaving operation, in accordance with an aspect of an exemplary embodiment.
Figure 6:
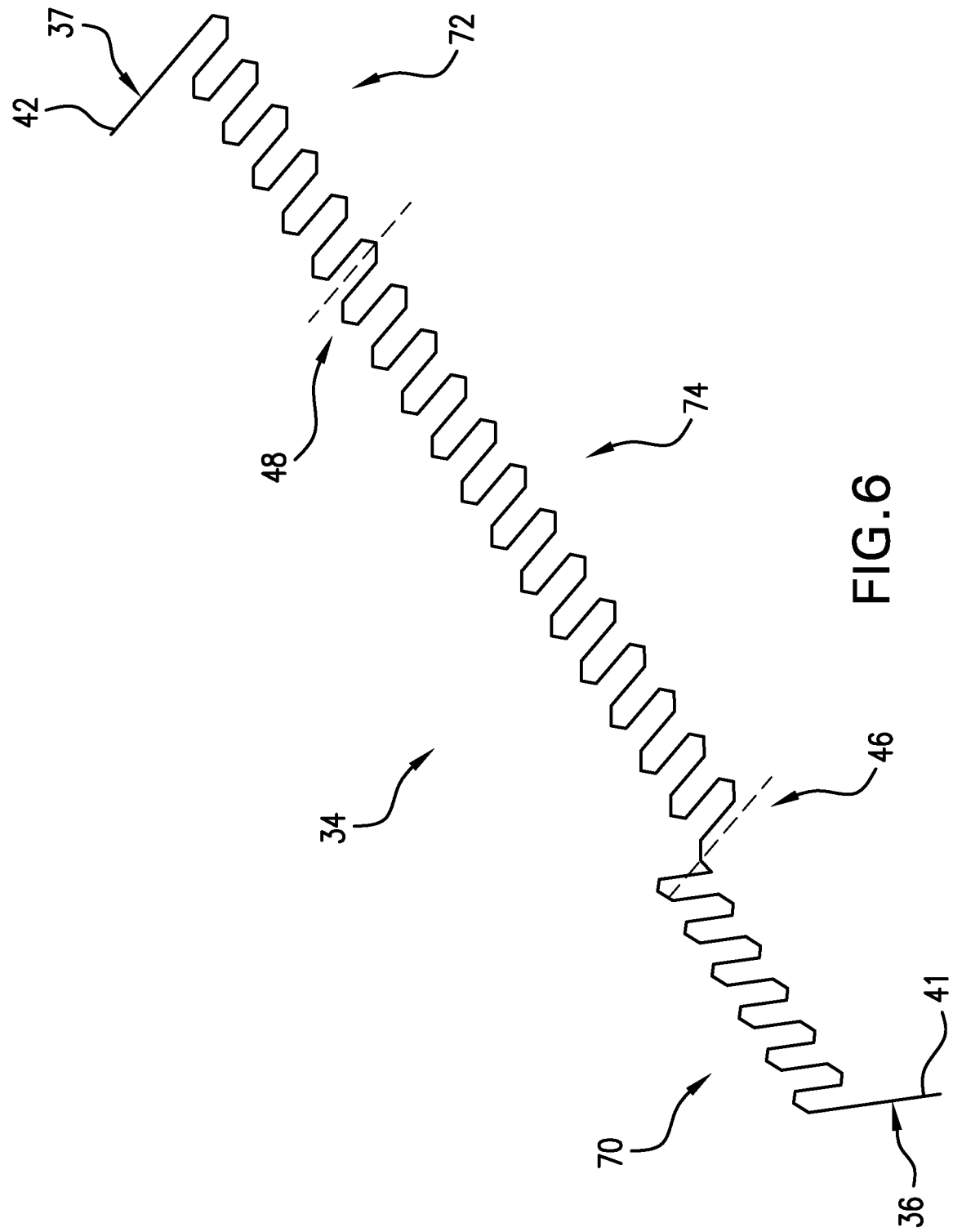
FIG. 6 depicts a first portion of the winding of FIG. 5 folded in a first direction, in accordance with an aspect of an exemplary embodiment.
Figure 7:
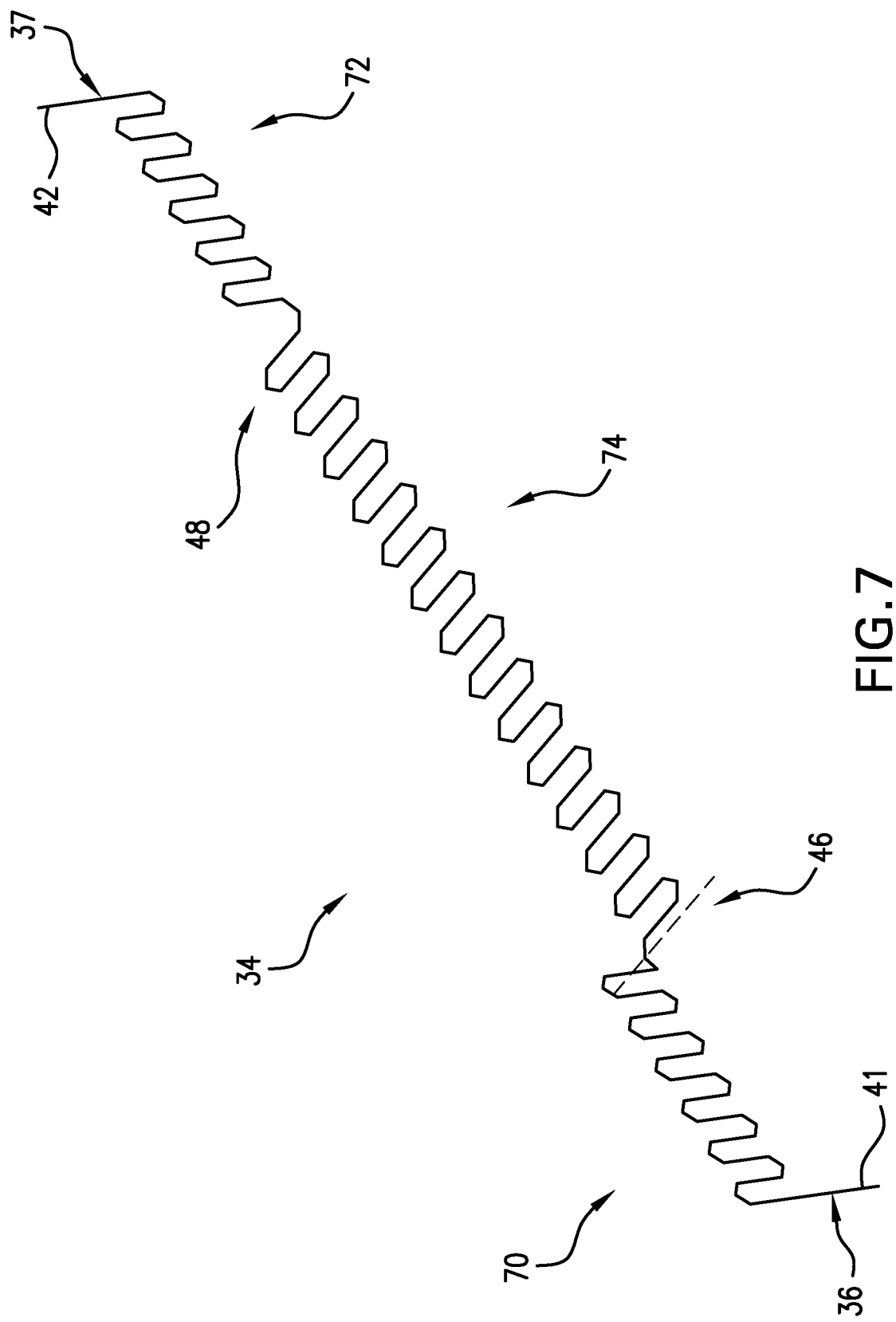
FIG. 7 depicts a second portion of the winding of FIG. 6 folded in the first direction, in accordance with an aspect of an exemplary embodiment.

Referring to FIGS. 5-7, first conductor 34 may be positioned and manipulated to prepare for acceptance of second conductor 52 as shown in FIG. 5. As an example, first conductor 34 may be bent, in a first direction forming a first section 70 defined between first end 36 and one of plurality of end turns 39 adjacent to bend 46 as shown in FIG. 6. First conductor 34 may also be bent in the first direction to form a second section defined between second end 37 and one of plurality of end turns 39 adjacent to bend 48 as shown in FIG. 7. A third section 74 may be defined between another one of plurality of end turns 39 adjacent to bend 46 and yet another one of plurality of end turns 39 adjacent to bend 48.

Figure 8:
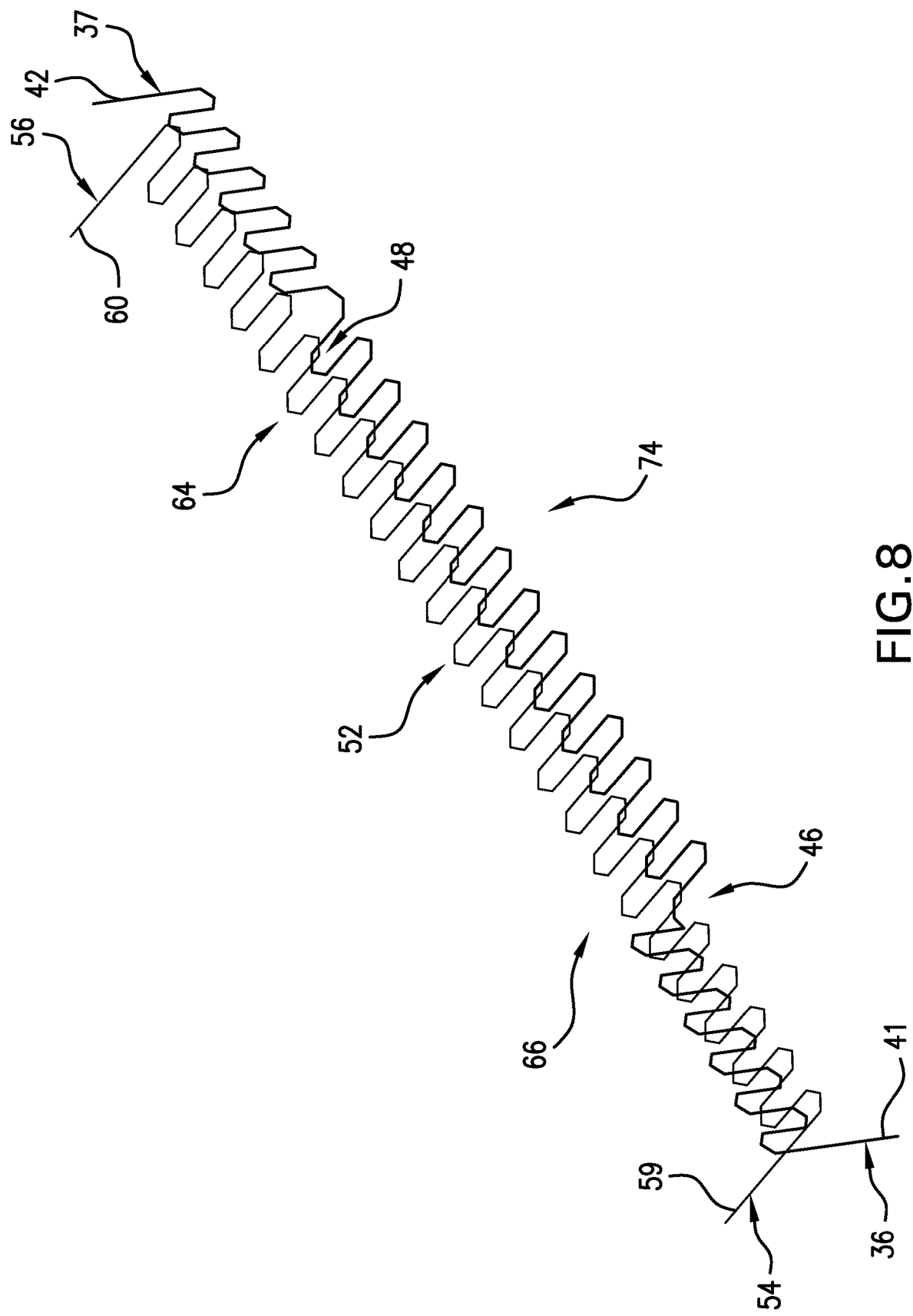
FIG. 8 depicts the another winding of FIG. 3 overlaid onto the winding of FIG. 7, in accordance with an aspect of an exemplary embodiment.
Figure 9:
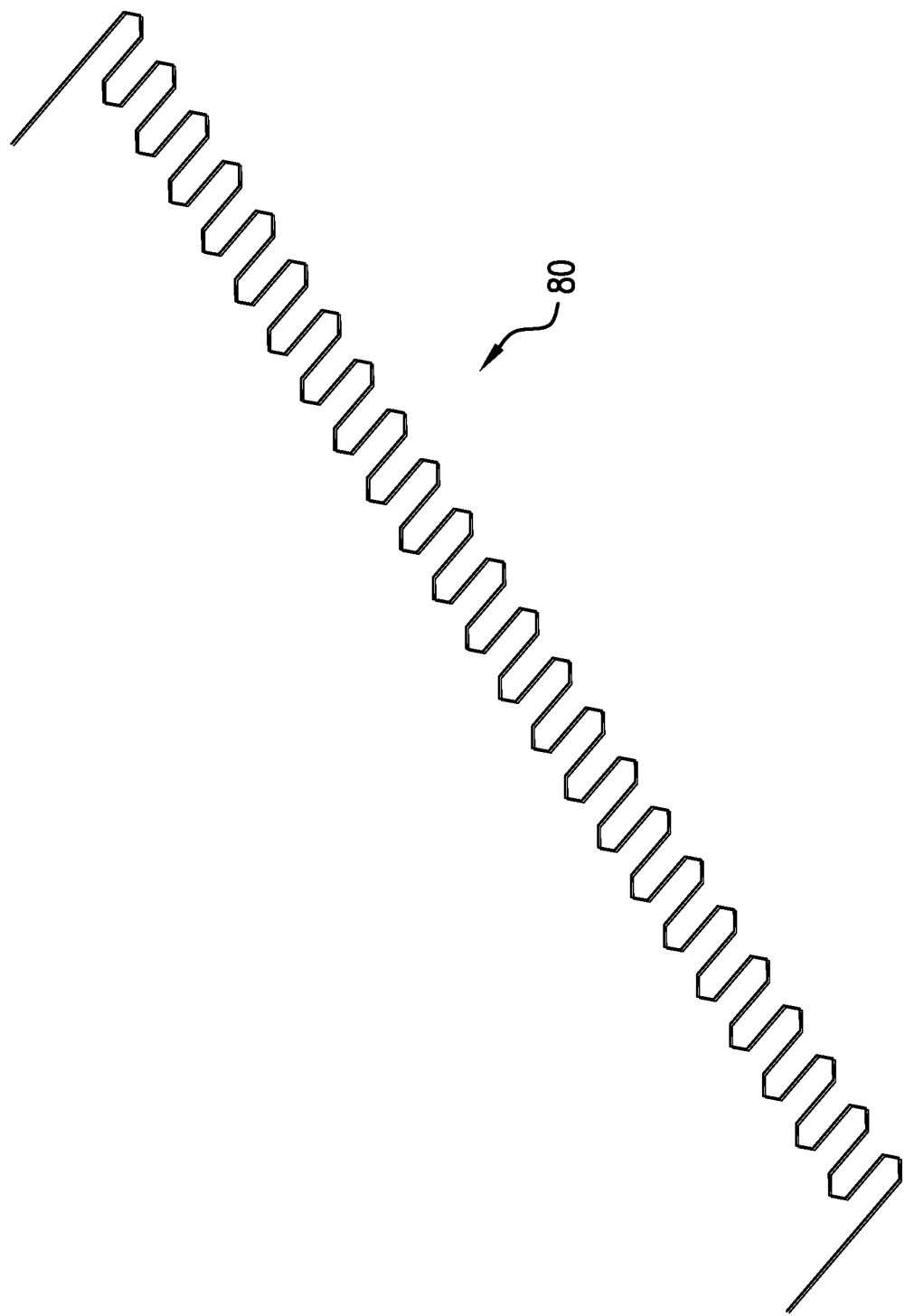
FIG. 9 depicts the first and second portions of the winding of FIG. 8 unfolded onto the another winding forming a first conductor pair, in accordance with an aspect of an exemplary embodiment.

At this point, second conductor 52 may be overlaid onto first conductor 34 as shown in FIG. 8. First section 70 and second section 72 may be unfolded. At this point, first and second portions of second conductor 52 (not separate labeled) lie below first section 70 and a third portion of second conductor 52 lies atop third section 74 forming a first conductor pair 80 for carrying a first electrical phase as shown in FIG. 9. First conductor pair 80 are formed as woven A and B conductors. At this point it should be understood that the terms "below" and "atop" should be understood to be presented for clarity and are not intended to impose any limitations on the positions of first and second conductors 34 and 52.

Figure 10:
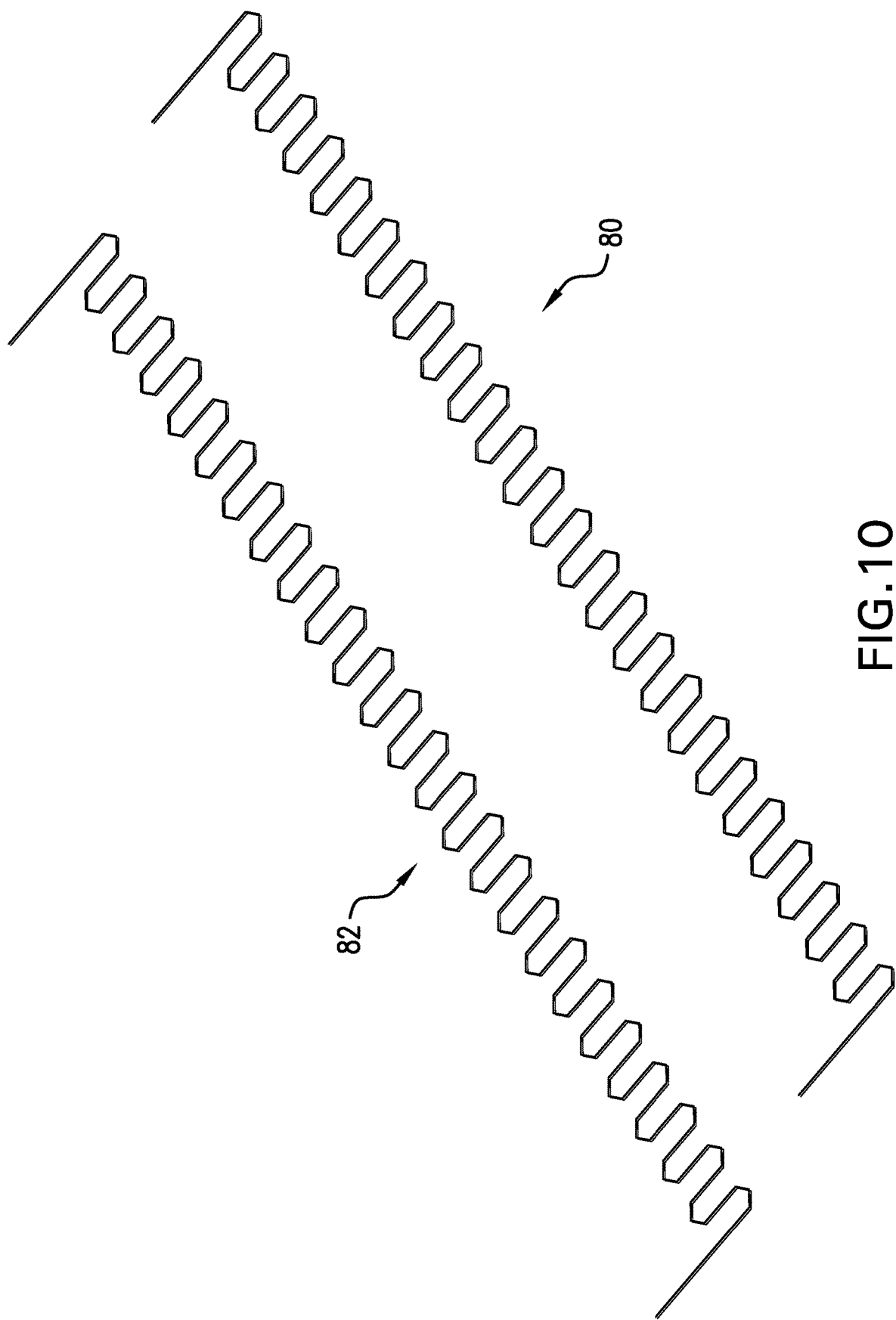
FIG. 10 depicts a second conductor pair being overlaid onto the first conductor pair, in accordance with an aspect of an exemplary embodiment.
Figure 11:
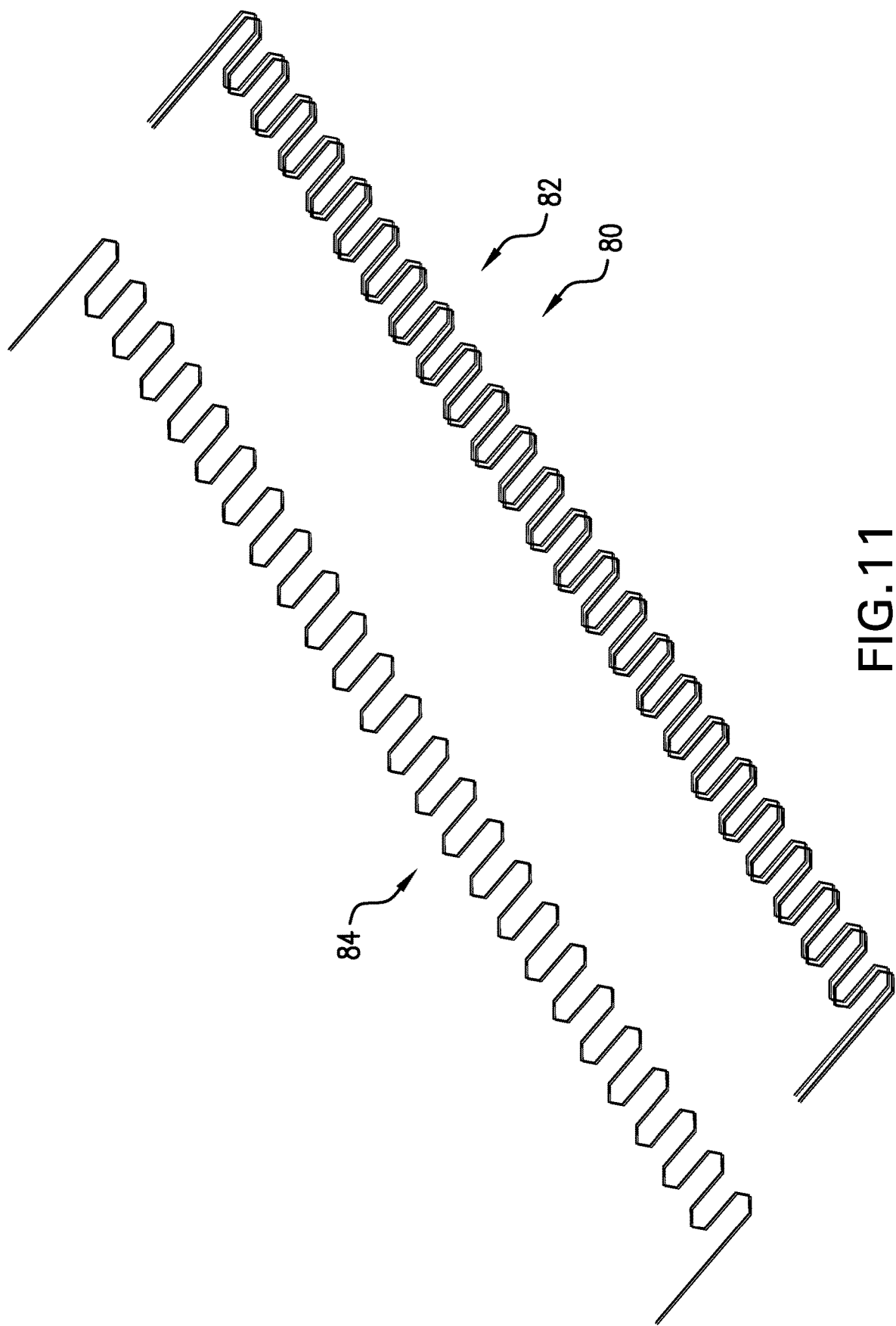
FIG. 11 depicts a third conductor pair being overlaid onto the first and second conductor pairs, in accordance with an aspect of an exemplary embodiment.
Figure 12:
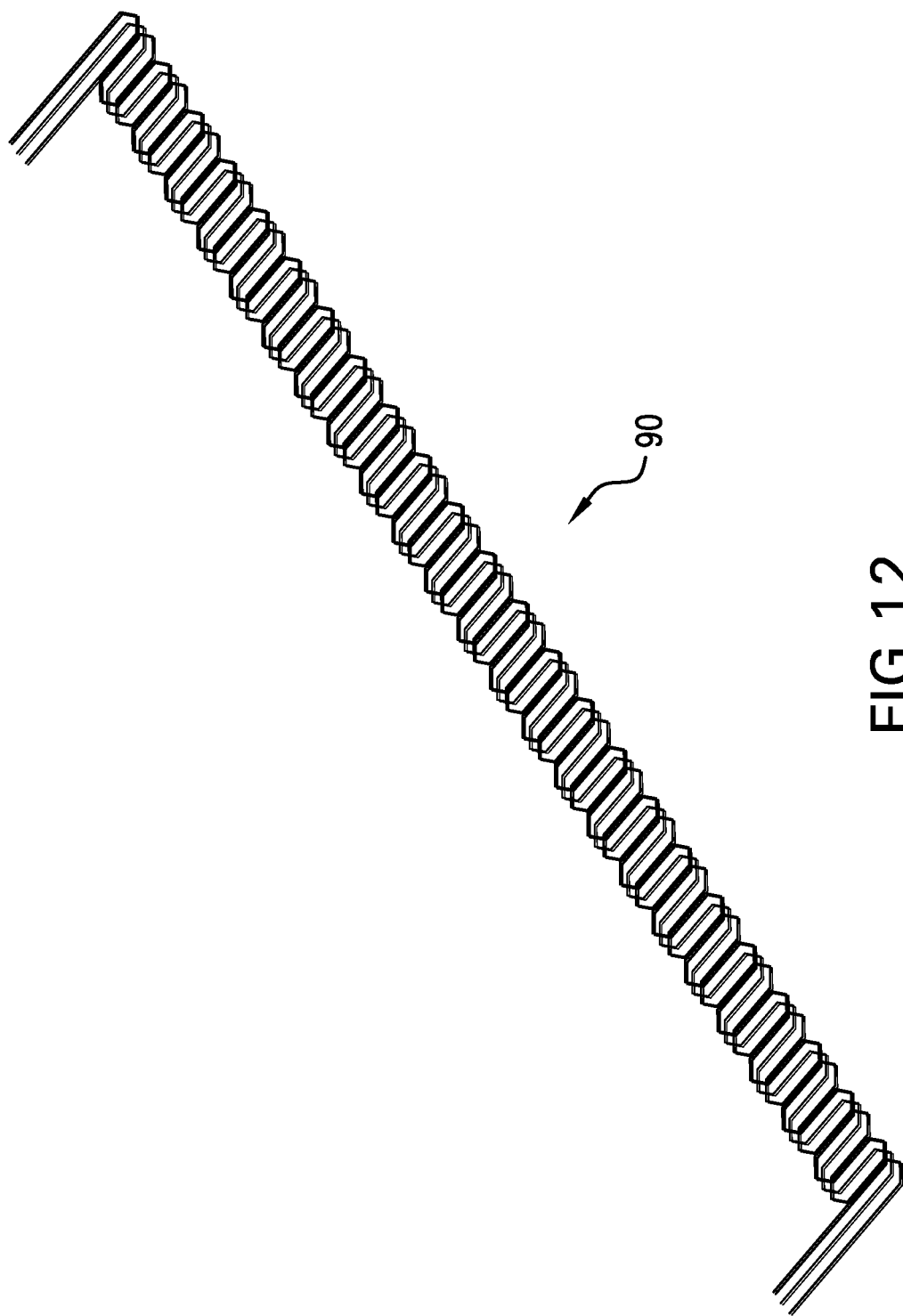
FIG. 12 depicts a first six conductor winding including the first, second, and third conductor pairs, in accordance with an aspect of an exemplary embodiment.
Figure 13:
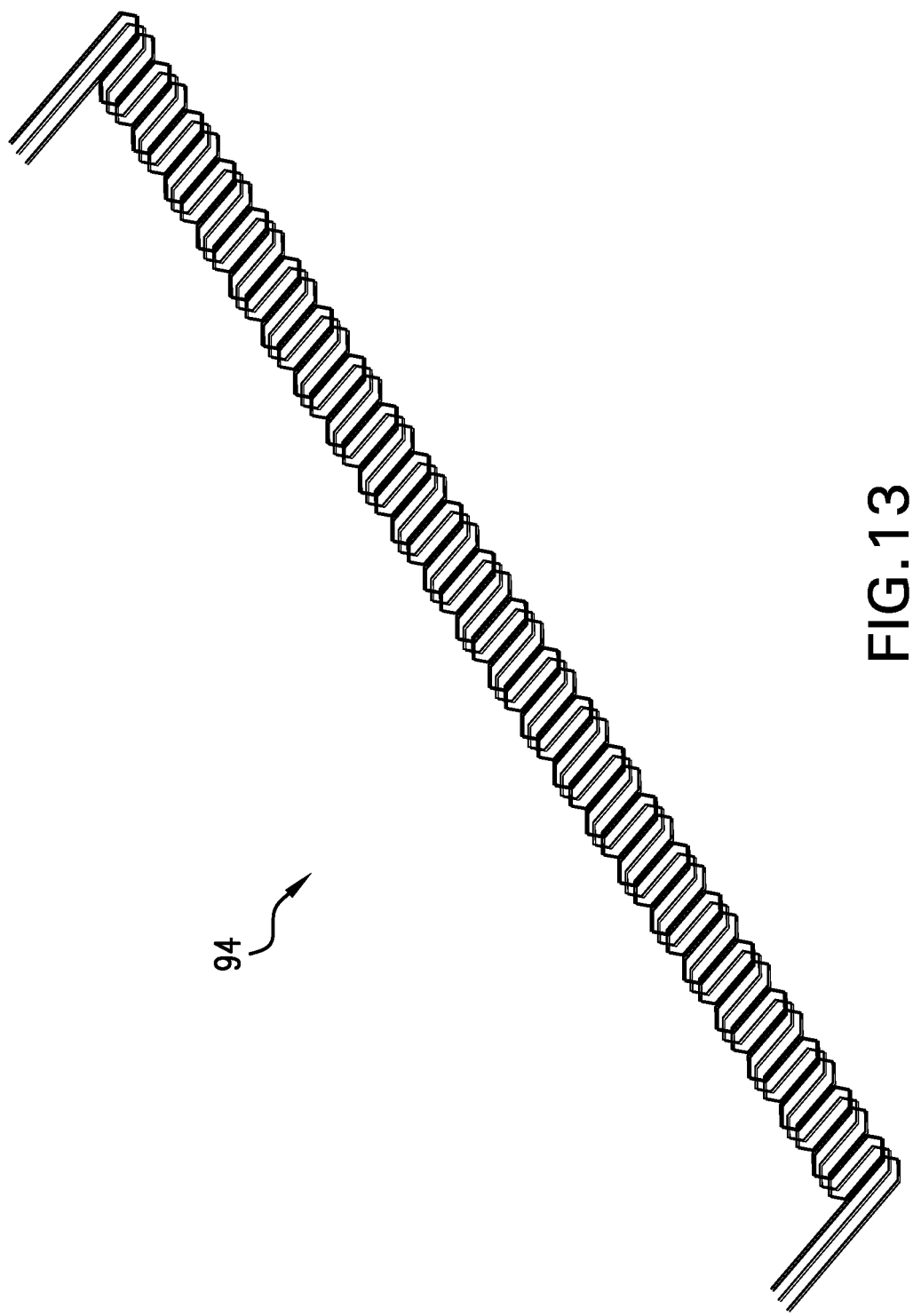
FIG. 13 depicts a second six conductor pair, formed in accordance with an aspect of an exemplary embodiment.

In accordance with an exemplary aspect, a second conductor pair 82, formed in a manner substantially similar to first conductor pair 80 is formed as shown in FIG. 10. Second conductor pair 82 is placed atop first conductor pair 80. In still further accordance with an exemplary aspect, a third conductor pair 84 is formed in a manner substantially similar to first conductor pair 80 and second conductor pair 82 as shown in FIG. 11. Third conductor pair 84 is placed atop first conductor pair 80 and second conductor pair 82 to form a first six conductor winding 90 as shown in FIG. 12. At this point, it should be understood that first six conductor winding 90 is formed by overlaying three two conductor pairs of AB conductors.

Figure 14:
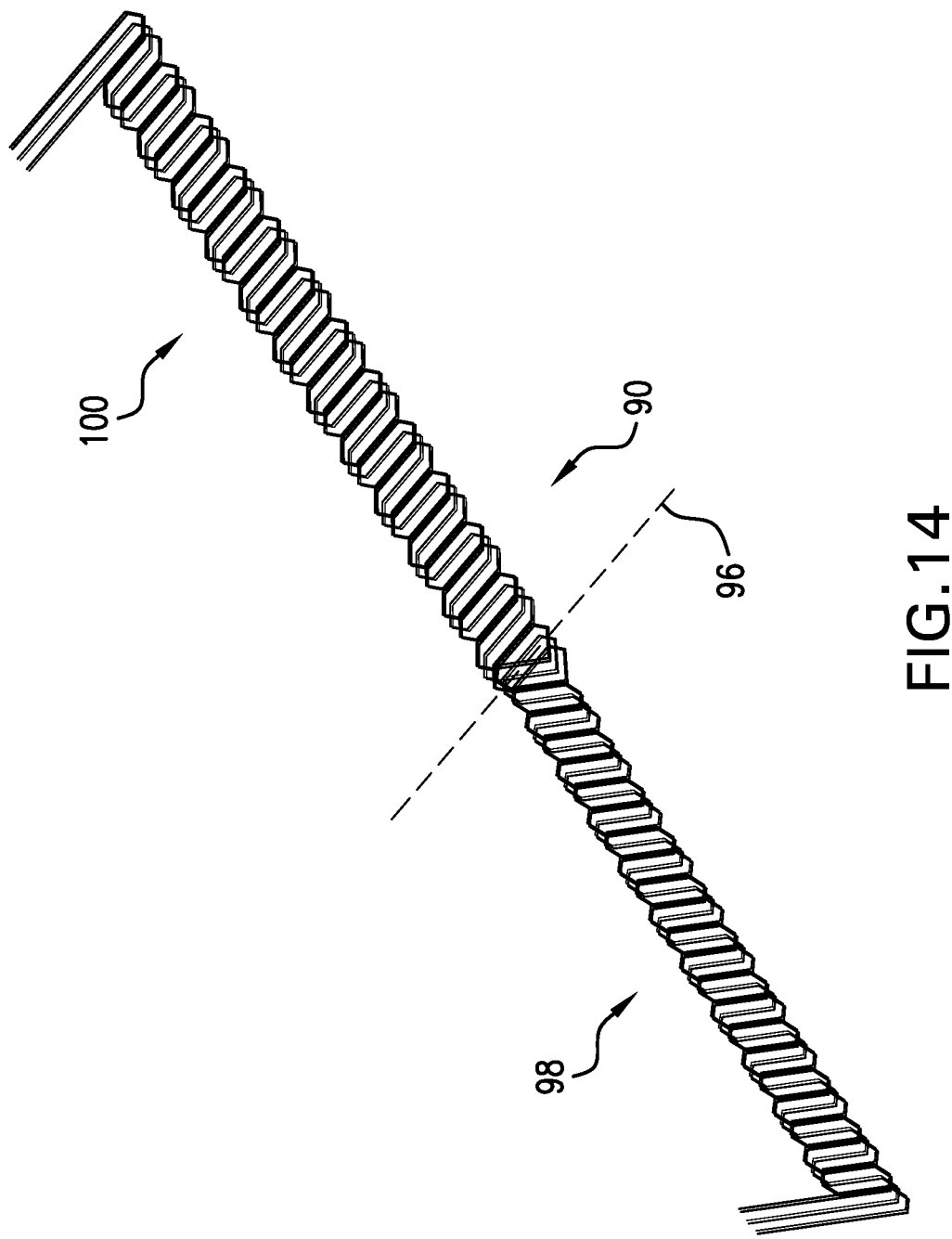
FIG. 14 first portion of the first six conductor winding rotating about a mid-axis, in accordance with an aspect of an exemplary embodiment.
Figure 15:
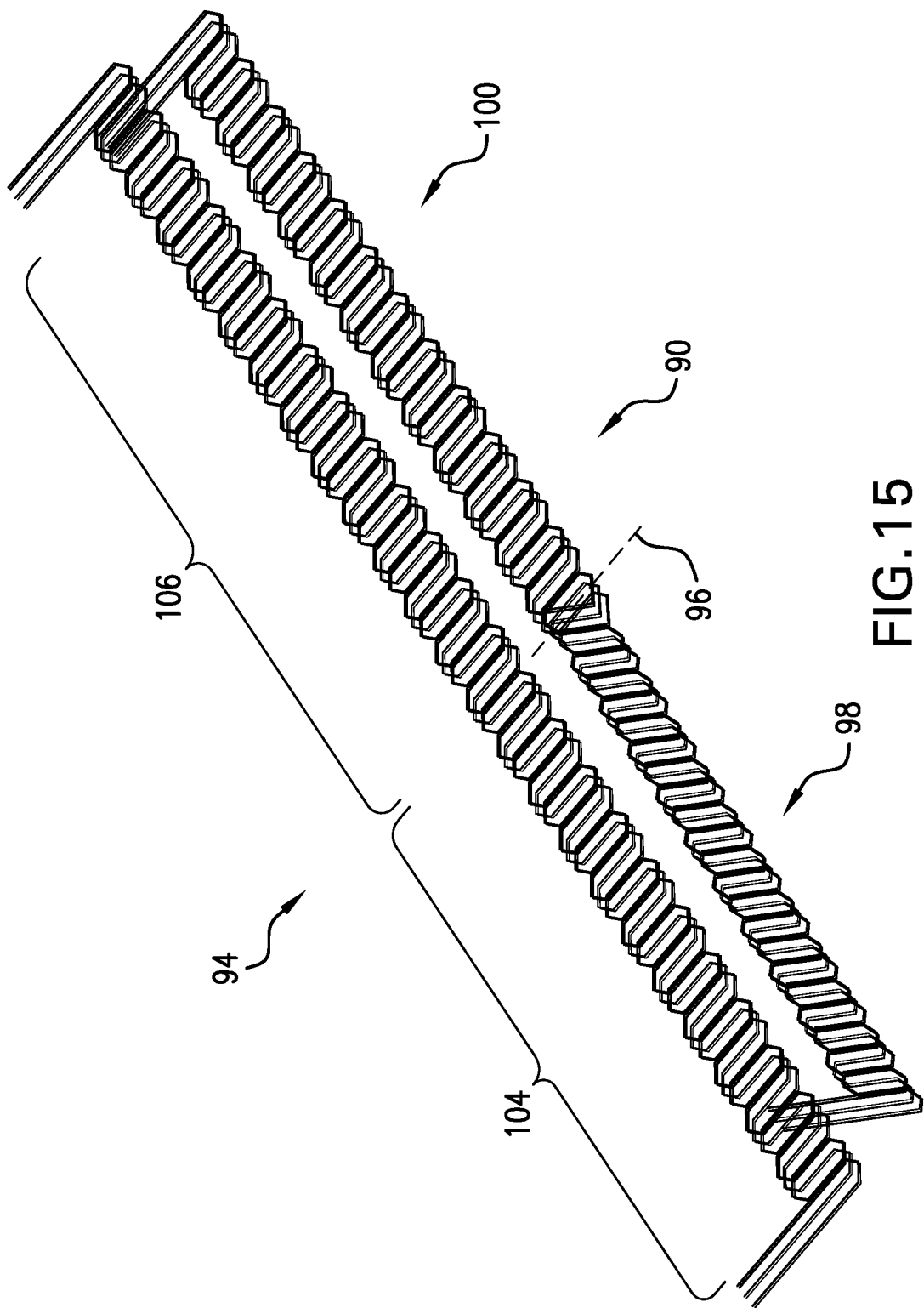
FIG. 15 depicts the second six conductor winding being overlaid onto the first six conductor winding, in accordance with an aspect of an exemplary embodiment.
Figure 16:
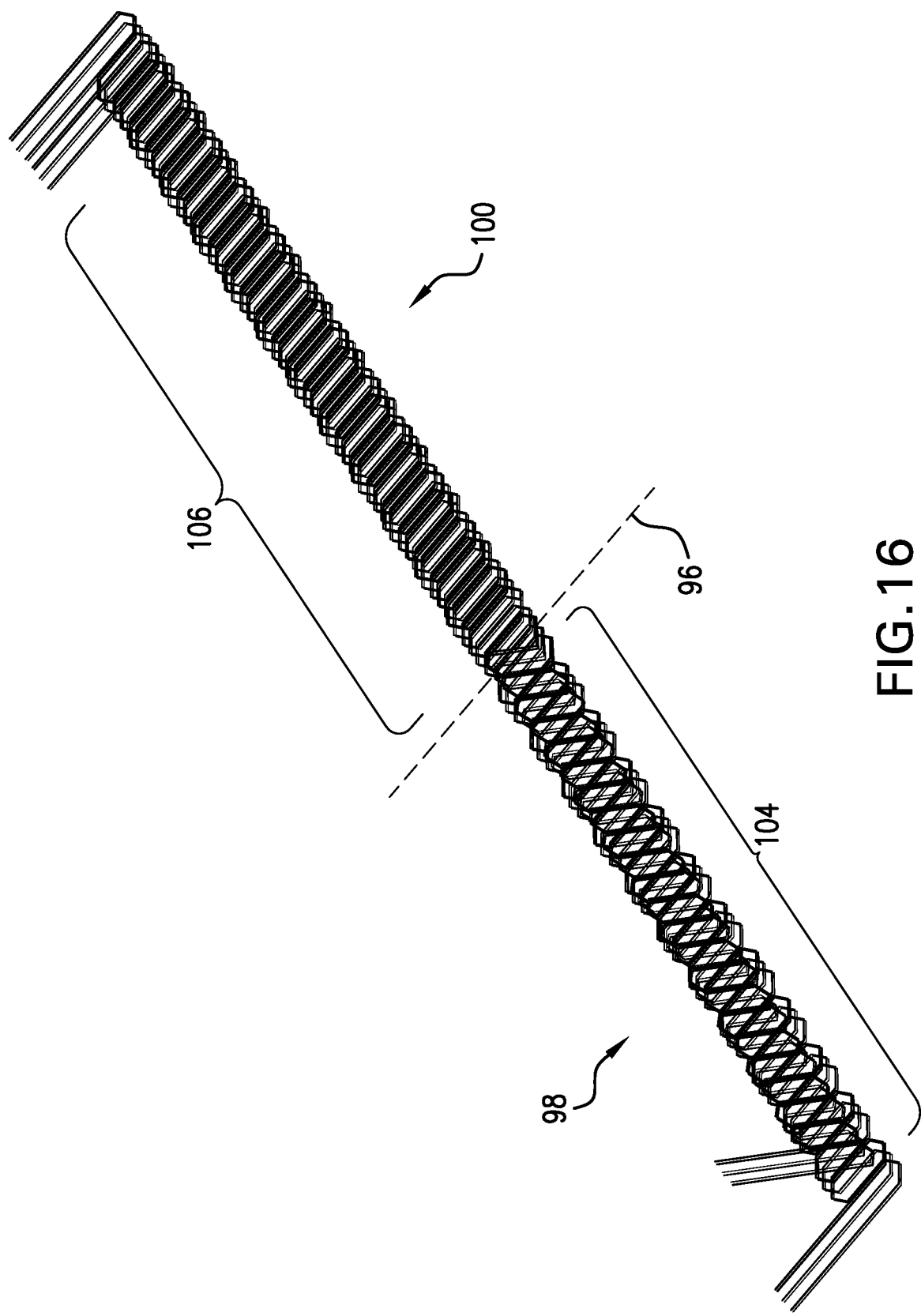
FIG. 16 depicts the portion of the first portion of the first six conductor winding being rotated into the second six conductor winding, in accordance with an aspect of an exemplary embodiment.
Figure 17:
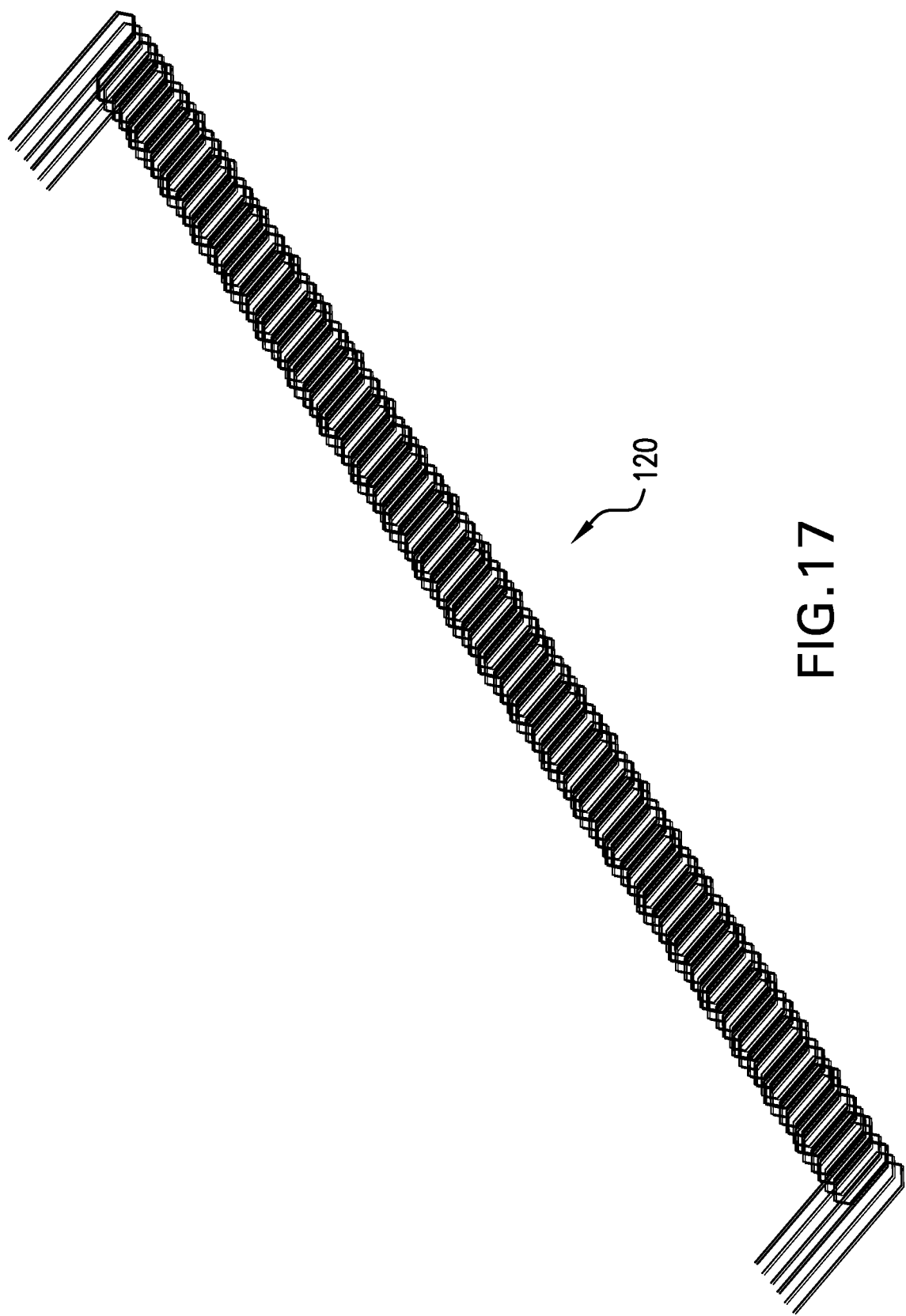
FIG. 17 depicts a first woven 12 conductor winding, in accordance with an aspect of an exemplary embodiment.

At this point, a second six conductor winding 94 is formed in a manner similar to that of first six conductor winding 90. Second six conductor winding 94 is however formed by overlaying three two conductor pairs of C/D conductors. First six conductor winding 90 may be rotated or bent about a mid-axis 96 as shown in FIG. 14, creating a first section 98 and a second section 100. Second six conductor winding 94 is placed atop first six conductor winding 90 as shown in FIG. 15. Second six conductor winding 94 includes a first portion 104 and a second portion 106. First section 98 may be unfolded as shown in FIG. 16 such that first portion 104 is below first section 98 and second portion 106 is atop second section 100 forming a first twelve conductor winding 120 having a first plurality of terminal leads 122 and a second plurality of terminal leads 124 as shown in FIG. 17. First twelve conductor winding 120 may then be loaded into stator body 12 in accordance with an exemplary embodiment. As will be detailed herein.

Figure 18:
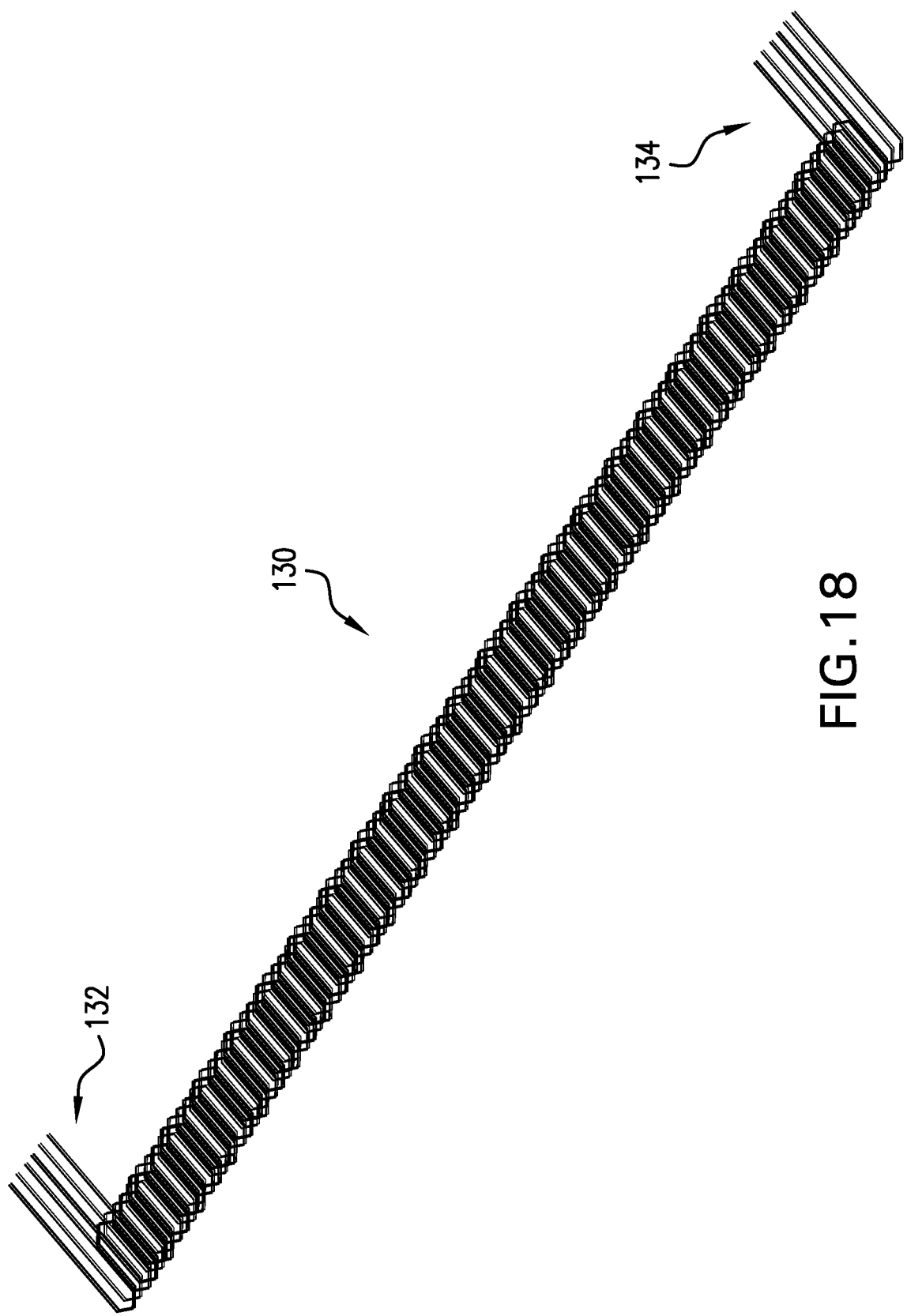
FIG. 18 depicts a second woven 12 conductor winding, in accordance with an aspect of an exemplary embodiment.
Figure 20:
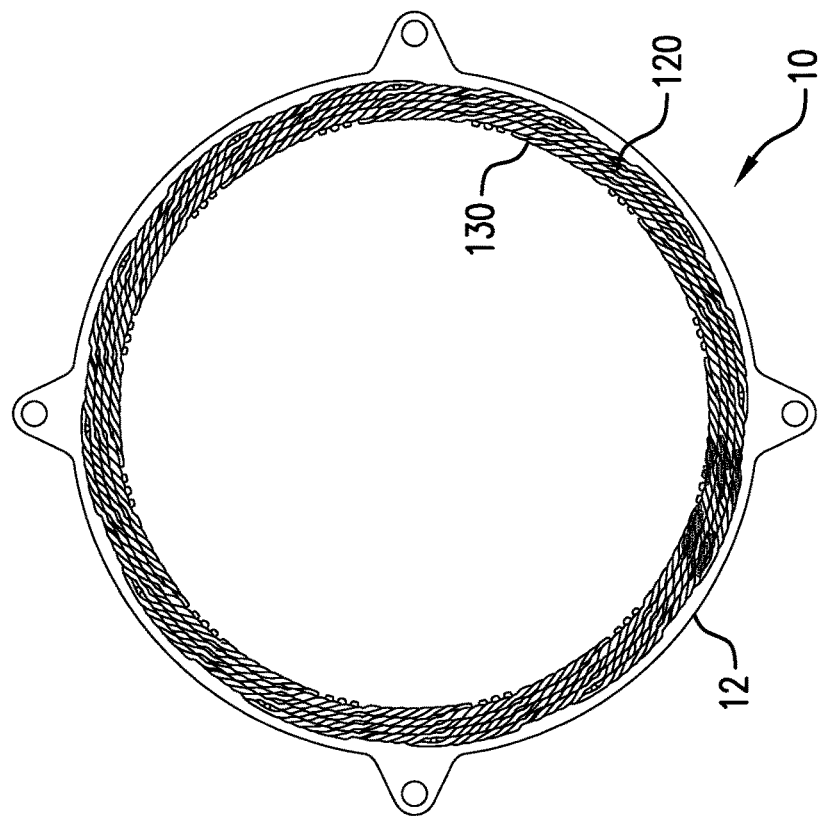
FIG. 20 depicts a top view of the stator of FIG. 19 receiving the second woven 12 conductor winding, in accordance with an aspect of an exemplary embodiment.
Figure 19:
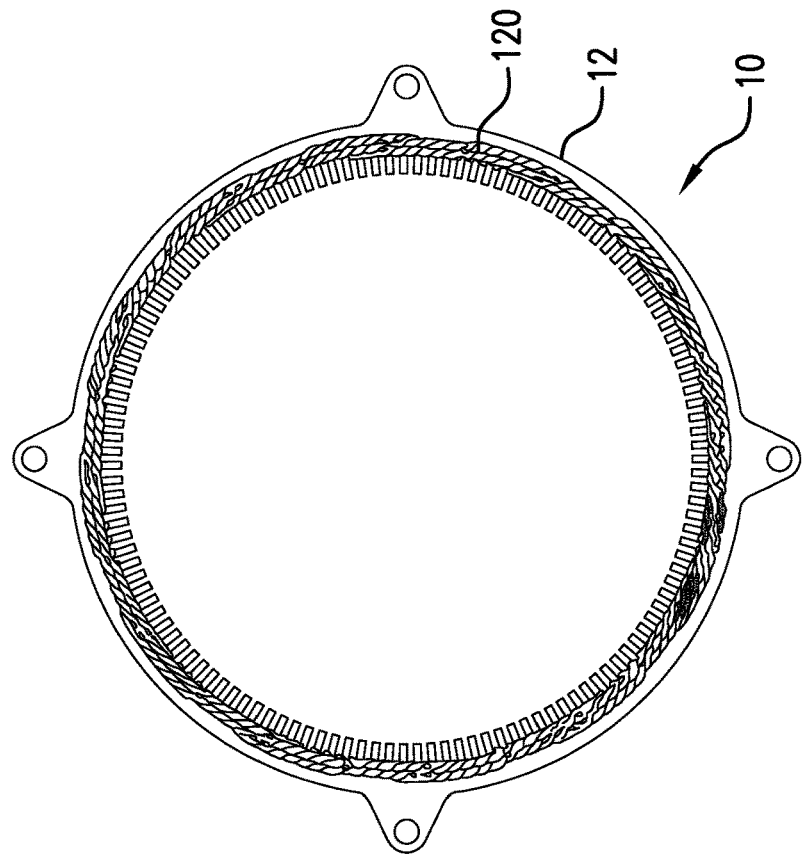
FIG. 19 depicts a top view of the stator of FIG. 1 receiving the first woven 12 conductor winding, in accordance with an aspect of an exemplary embodiment.

After forming first twelve conductor winding 120, a second twelve conductor winding 130 is formed such as shown in FIG. 18. Second twelve conductor winding 130 includes a third plurality of terminal leads 132 and a fourth plurality of terminal leads 134. At this point, first twelve conductor winding 120 and second twelve conductor winding 130 may be introduced into stator body 12. In an embodiment, first twelve conductor winding 120 is introduced into stator body 12 and expanded outwardly into a plurality of stator slots (not separately labeled) as shown in FIG. 19. In an embodiment, first twelve conductor winding 120 may wrap around stator body 12 two times. After expanding first twelve conductor winding 120, second twelve conductor winding 130 may be introduced and expanded into the plurality of stator slots to sit radially inwardly of first twelve conductor winding 120. At this point, second plurality of terminal leads 124 may be connected to third plurality of terminal leads 132 as will be detailed herein.

In accordance with another exemplary aspect, first twelve conductor winding 120 and second twelve conductor winding 130 may be combined and arranged in stator body 12. A combined first twelve conductor winding 120 and second twelve conductor winding 130 may then be expanded radially outwardly into the plurality of slots. In one exemplary aspect, second plurality of terminal leads 122 may be connected to third plurality of terminal leads 132 prior to expansion. In another exemplary aspect, second plurality of terminal leads 122 may be connected to third plurality of terminal leads 132 after expansion.

Figure 21:
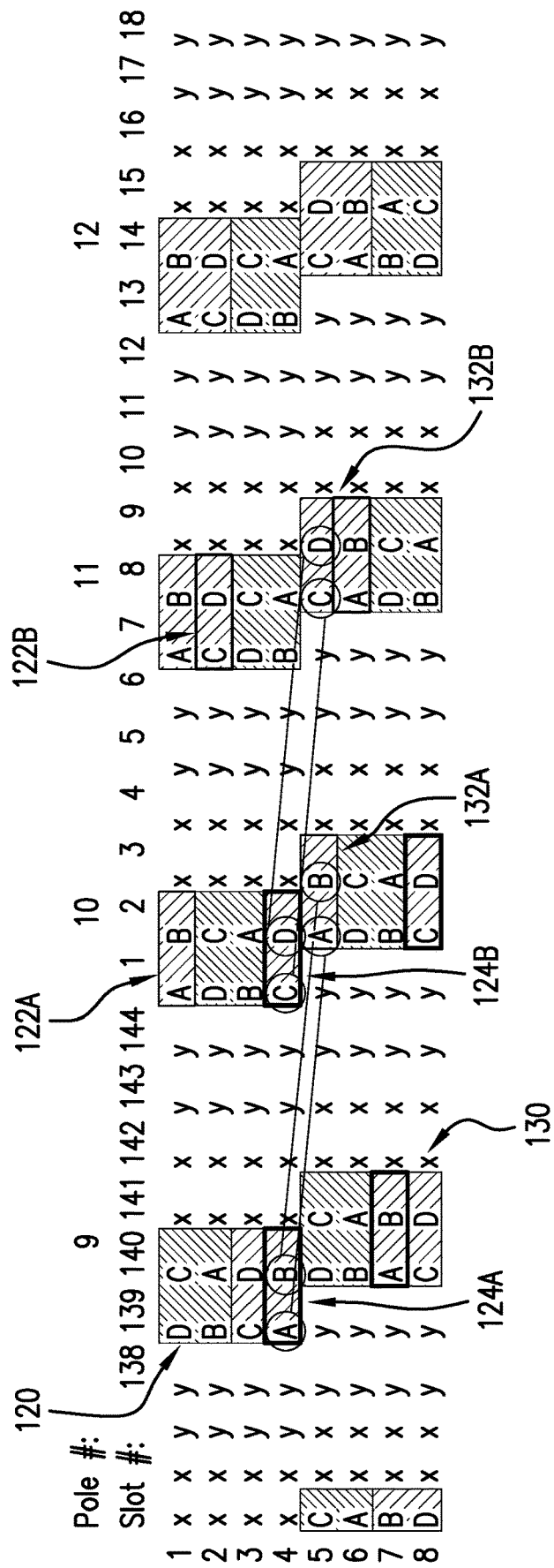
FIG. 21 depicts the first woven 12 conductor winding being connected to the second woven 12 conductor winding, in accordance with an aspect of an exemplary embodiment.

Reference will now follow to FIG. 21 in describing an exemplary connection of second plurality of terminal leads 122 to third plurality of terminal leads 132. In FIG. 21, only the first phase is detailed with letters A through D. A second phase is identified only as x and the third phase is identified only as y. The layers of the winding are labeled 1 through 8 on the left side of the page. The slots are labeled 1 through 18 and then 138 thru 144. It should be understood the actual stator is circular and includes slots 1-144 but for simplicity, FIG. 21 only shows slots 1-18 and 138-144. The first twelve conductor winding 120 is disposed in the outermost layers, layers 1-4. The second twelve conductor winding 130 is disposed in the inner most layers, layer 5 through 8. The second twelve conductor winding 130 is introduced into the stator slots shifted 1 slot from the first twelve conductor winding 120. The shift can be seen in FIG. 21 as the second twelve conductor winding 130 is disposed in slots 2 and 3 and the first twelve conductor winding 120 is disposed in slots 1 and 2. It should be understood that the second and third phases may be connected in a similar manner as the first phase.

In accordance with an exemplary aspect, first plurality of terminal ends 122A and 122B are arranged in different layers of stator body 12 and provide an external connection point (not separately labeled). While shown as two pairs, e.g., an A/B pair and a C/D pair, it should be understood that the external connection point of first twelve conductor winding 120 includes 6 conductor pairs. The first twelve conductor winding 120 has a conductor A that has a slot segment in layer 1 of slot 1 that extend out of the page as a lead 122A. A bottom side end turn (end turns are not shown in FIG. 21) connects the slot segment A in layer 1 of slot 1 to the slot segment A in layer 1 of slot 7. A topside end turn connects the slot segment A in layer 1 of slot 7 with the slot segment A in layer 1 of slot 13. This pattern alternating topside and bottom side end turns and slot segments continues onto the right and circles back on the circular stator core until it reaches slot 140. At slot 140, the conductor A is disposed in layer 2 of slot 140. A topside end turn connects the slot segment A in slot layer 2 of slot 140 with slot segment A in layer 3 of slot 2. A bottom side end turn connects the slot segment A in layer 3 of slot 2 with the slot segment A in layer 4 of slot 8. The spiral pattern is evident as conductor A is substantially disposed in layer 1 and 2 for the first circumference around the stator slots, but then disposed in layers 3 and four for the second circumference around the stator slots. The pattern continues again around the stator slots alternating slot segments with topside end turns and bottom side end turns. Conductor A extends from layer 4 in slot 139 as a lead 124A. Conductors B, C and D of first twelve conductor winding 120 are the same as conductor A except they are shifted by one slot and or 1 layer as they spiral around the stator slots from leads at 122A or 122B until the extend as leads from 124A or 124B. The conductors A, B, C and D of the second twelve conductor winding 130 are similar to the conductors A, B, C, and D of the first twelve conductor winding 120 except they are shifted 1 slot to the right, and inserted into layers 5 through 8.

Second plurality of terminal leads 124A and 124B may be arranged in a single layer of stator body 12 and define an internal connection point (not separately labeled). In accordance with an exemplary aspect, third plurality of terminal leads 132A and 132B may be arranged in a single layers of stator body 12 and provide an internal connection point (not separately labeled). While shown as two pairs, e.g., an A/B pair and a C/D pair, it should be understood that the internal connection point of second twelve conductor winding 130 includes 6 conductor pairs. Second twelve conductor winding 130 also include an external connection point defined by fourth terminal leads 134A and 134B.

In an embodiment, first twelve conductor winding 120 is connected in series to second twelve conductor winding 130. Thus, in FIG. 21, second plurality of terminal leads 124A connect with third plurality of terminal leads 132A and second plurality of terminal leads 124B connect with third plurality of terminal leads 132B. FIG. 21 shows 4 separate connections as shown by the four lines (not labeled). The lead A of leads 124A is connected to lead A of leads 132A. Similarly, lead B of leads 124A is connected to lead B of leads 132A. Lead C of leads 124B is connected to lead C of leads 132B. Similarly, lead D of leads 124B is connected to lead D of leads 132B. In an embodiment, connections may be made through solder joints, welded joints, brazed joints or the like. Also, while not shown, it should be understood that the connections for the other phases may be similar to those shown, just shifted over 2 slots for the second phase and 4 slots for the third phase. One advantage of this design is all of the series connections are the same pitch and therefore can be the same shape. Another advantage is the series connections are located in layers 4 and 5 which is radially the center between the outer most layer 1 and the innermost layer 8. This is an advantage because the leads are located in the two most inner layers 7 and 8 and the two most outer layers 1 and 2 and therefore the leads and the series connections are not interfering with each other.

Figure 22:
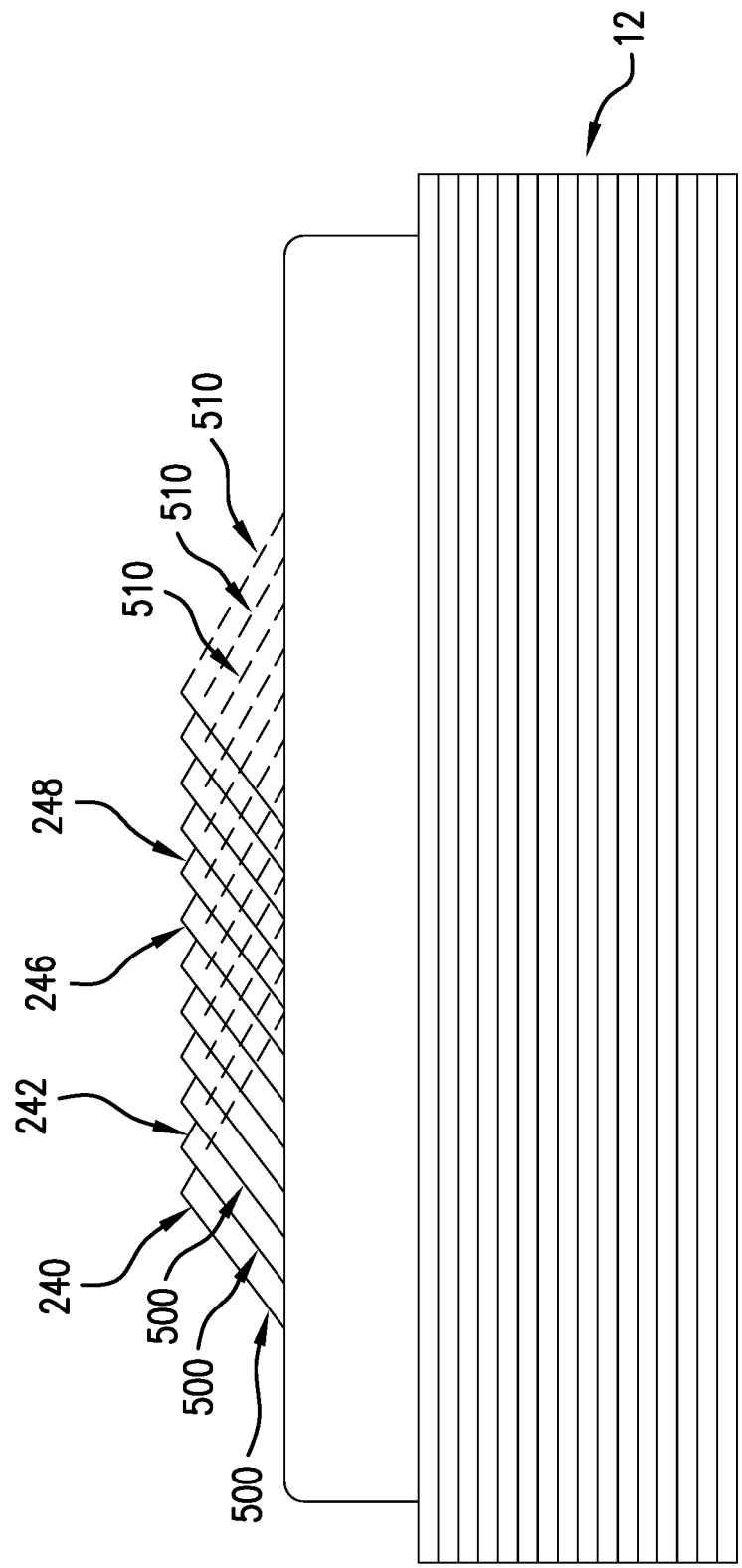
FIG. 22 depicts a partial side view of the stator illustrating the first woven 12 conductor winding being connected to the second woven 12 conductor winding, in accordance with an aspect of an exemplary embodiment.

FIG. 22 depicts a side view of stator body 12 along with end loops and the series connections 240, 242, 246 and 248 between first twelve conductor winding 120 and second twelve conductor winding 130 forming a first phase (not separately labeled). The series connections 240, 242, 246 and 248 are connect axially on top of the end loops. Due to the series connections 240, 242, 246 and 248 being all the same pitch and shape, they can be triangular shaped like the triangular end loop. This allows them to nest together with the legs 500 of second twelve conductor winding 130 being radially inward of the legs 510 of first twelve conductor winding 120.

At this point, it should be understood that the exemplary embodiments describe a system for forming a stator having a multi-piece winding. That is, a winding is formed, combined with at least one other winding, installed into a stator and connected. In this manner, a stator winding may be formed and fit into a stator core having a small form factor. By installing one winding after another winding, e.g., employing multiple radial expansion operations the winding may be installed into a stator body that does not have the geometry that would be receptive to a single piece winding. Further while described as being formed from first and second windings, it should be understood that the winding could include three or more windings. After insertion the windings could be connected in a Delta configuration or a wye configuration. The exemplary embodiments depict a cascaded winding where one wire is housed in the same layer for at least three consecutive layers. It is also understood that a multiple parallel wire (say 4 or more parallel wires) interlaced winding (commonly created by a hairpin winding) may also have a similar half winding connection scheme.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of installing a winding in a stator comprising:
   forming a first multi-conductor winding including a first plurality of terminal leads and a second plurality of terminal leads;
   forming a second multi-conductor winding including a third plurality of terminal leads and a fourth plurality of terminal leads;
   introducing the first multi-conductor winding into a plurality of stator slots of a stator body;
   introducing the second multi-conductor winding into the plurality of stator slots of the stator body radially inwardly of the first multi-conductor winding, the second multi-conductor winding being fully radially inwardly disposed in an innermost layer relative to the first multi-conductor winding; and
   connecting the second plurality of terminal leads with the third plurality of terminal leads to form the winding for the stator.

2. The method of claim 1, wherein connecting the second plurality of terminal leads with the third plurality of terminal leads includes forming a welded connection between each of the second plurality of terminal leads and corresponding ones of each of the third plurality of terminal leads.

3. The method of claim 1, wherein connecting the second plurality of terminal leads with the third plurality of terminal leads includes forming a serial connection between the first multi-conductor winding and the second multi-conductor winding.

4. The method of claim 1, wherein connecting the second plurality of terminal leads with the third plurality of terminal leads includes forming a solder joint between each of the second plurality of terminal leads and corresponding ones of each of the third plurality of terminal leads.

5. The method of claim 1, wherein connecting the second plurality of terminal leads with the third plurality of terminal leads includes forming a brazed connection between each of the second plurality of terminal leads and corresponding ones of each of the third plurality of terminal leads.

6. The method of claim 1, wherein connecting the second plurality of terminal leads with the third plurality of terminal leads includes forming a connection having a pitch and shape that corresponds to a pitch and shape of end turn portions of the first multi-conductor winding and the second multi-conductor winding.

7. The method of claim 1, wherein connecting the second plurality of terminal leads with the third plurality of terminal leads includes nesting the second plurality of terminal leads with the first plurality of terminal leads.

8. The method of claim 1, wherein installing the first multi-conductor winding and introducing the second multi-conductor winding into the plurality of stator slots of the stator body includes expanding the first multi-conductor winding combined with the second multi-conductor winding radially outwardly into the stator body.

9. The method of claim 1 wherein installing the first multi-conductor winding and introducing the second multi-conductor winding into the plurality of stator slots of the stator body includes expanding the second multi-conductor winding into the plurality of stator slots after expanding the first multi-conductor winding into the plurality of stator slots.

10. The method of claim 1, wherein forming first multi-conductor winding includes forming a first twelve conductor winding and forming the second multi-conductor winding includes forming a second twelve conductor winding.

11. The method of claim 1, wherein introducing the first multi-conductor winding into the plurality of stator slots includes forming an outermost layer of the winding and introducing the second multi-conductor winding includes forming an innermost layer of the winding.

12. The method of claim 11, wherein introducing the second multi-conductor winding into the plurality of stator slots includes introducing the second multi-conductor winding shifted one slot from the first multi-conductor winding.

13. The method of claim 11, wherein introducing the first multi-conductor winding into the plurality of stator slots includes introducing the first plurality of terminal leads in an outer layer of the winding and the second plurality of terminal leads in a middle layer of the winding.

14. The method of claim 13, wherein introducing the second multi-conductor winding into the plurality of stator slots includes introducing the third plurality of terminal leads in the middle layer of the winding and the fourth plurality of terminal leads in an inner layer of the winding.

15. The method of claim 14, wherein connecting the second plurality of terminal leads with the third plurality of terminal leads includes connecting the second plurality of terminal leads in the middle layer of the winding with the third plurality of terminal leads in the middle layer of the winding.

16. The method of claim 14, wherein introducing the first multi-conductor winding into the plurality of stator slots includes introducing the first multi-conductor winding in a spiral wrap around the plurality of stator slots from the first plurality of terminal leads in the outer layer of the winding to the second plurality of terminal leads in the middle layer of the winding.

17. The method of claim 16, wherein introducing the second multi-conductor winding into the plurality of stator slots includes introducing the second multi-conductor winding in a spiral wrap around the plurality of stator slots from the third plurality of terminal leads in the middle layer of the winding to the fourth plurality of terminal leads in the inner layer of the winding.

18. The method of claim 17, wherein introducing the first multi-conductor winding into the plurality of stator slots includes introducing a portion of the first plurality of terminal leads into the outermost layer of the winding and introducing the second multi-conductor winding includes introducing a portion of the fourth plurality of terminal leads into the innermost layer of the winding.

* * * * *